United States Patent
Izuhara et al.

(10) Patent No.: US 9,592,827 B2
(45) Date of Patent: Mar. 14, 2017

(54) COLLISION MITIGATION APPARATUS AND COLLISION MITIGATION PROGRAM

(71) Applicant: DENSO CORPORATION, Kariya, Aichi-pref. (JP)

(72) Inventors: Hideshi Izuhara, Kasugai (JP); Masao Oooka, Gamagori (JP); Yousuke Hattori, Aichen-ken (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/749,994

(22) Filed: Jun. 25, 2015

(65) Prior Publication Data
US 2015/0375743 A1 Dec. 31, 2015

(30) Foreign Application Priority Data

Jun. 26, 2014 (JP) .................................. 2014-131372

(51) Int. Cl.
*B60W 30/08* (2012.01)
*B60W 30/09* (2012.01)
*G01C 21/26* (2006.01)

(52) U.S. Cl.
CPC .................................. *B60W 30/09* (2013.01)

(58) Field of Classification Search
CPC ...... B60W 30/08; B60W 30/09; B60W 50/04; G01C 21/26; G08G 1/166
USPC ............. 701/36, 96, 300, 301; 340/436, 148
See application file for complete search history.

(56) References Cited

U.S. PATENT DOCUMENTS

| | | | | |
|---|---|---|---|---|
| 6,307,484 | B1 * | 10/2001 | Sasaki | G08G 1/164 340/436 |
| 9,031,776 | B2 * | 5/2015 | Goudy | G08G 1/161 701/301 |
| 2002/0036584 | A1 * | 3/2002 | Jocoy | G01S 13/931 342/70 |
| 2007/0282532 | A1 * | 12/2007 | Yamamoto | B60R 21/0134 701/301 |
| 2008/0015772 | A1 * | 1/2008 | Sanma | B60K 35/00 701/408 |

(Continued)

FOREIGN PATENT DOCUMENTS

| JP | A-2002-260192 | 9/2002 |
|---|---|---|
| JP | A-2005-202693 | 7/2005 |
| JP | 2010-015450 | 1/2010 |

*Primary Examiner* — Tan Q Nguyen
(74) *Attorney, Agent, or Firm* — Knobbe, Martens, Olson & Bear, LLP (57) ABSTRACT

A collision mitigation apparatus is mounted to an own vehicle and mitigates a collision between the own vehicle and an obstacle. The collision mitigation apparatus acquires information indicating that the own vehicle will make a right turn or a left turn at an intersection. When the information indicating that the own vehicle will make the right turn or the left turn at the intersection is acquired, the collision mitigation apparatus sets a target area on a predicted route of the own vehicle at the intersection. The collision mitigation apparatus determines whether or not an obstacle that becomes an obstacle for travelling of the own vehicle is present in or is entering the target area. When the obstacle is present in or is entering the target area, the collision mitigation apparatus performs output to mitigate a collision between the own vehicle and the obstacle.

14 Claims, 8 Drawing Sheets

(56) References Cited

U.S. PATENT DOCUMENTS

2012/0025965 A1* 2/2012 Mochizuki ............. B60Q 9/008
340/435
2012/0283895 A1* 11/2012 Noda ..................... G08G 1/166
701/1

* cited by examiner

FIG.9
(UPON EXIT DETERMINATION)

COLLISION MITIGATION APPARATUS AND COLLISION MITIGATION PROGRAM

CROSS-REFERENCE TO RELATED APPLICATION

This application is based on and claims the benefit of priority from Japanese Patent Application No. 2014-131372, filed Jun. 26, 2014, the disclosure of which is incorporated herein in its entirety by reference.

BACKGROUND

Technical Field

The present disclosure relates to a collision mitigation apparatus that mitigates a collision between an own vehicle and an obstacle, and a collision mitigation program.

Related Art

As the above-described collision mitigation apparatus, an apparatus is known that suppresses malfunction of the collision mitigation apparatus by suppressing an actuation for mitigating impact of a collision between an own vehicle and another vehicle or the like, when the own vehicle is travelling on a curve (refer to, for example, JP-A-2010-015450).

In the collision mitigation apparatus, prevention of a malfunction at intersections is also required. However, the above-described collision mitigation apparatus is problematic in that only cases in which the own vehicle is travelling on a curve are supported.

SUMMARY

It is thus desired to enable suppression of malfunction at an intersection, in a collision mitigation apparatus that mitigates a collision between an own vehicle and an obstacle.

An exemplary embodiment provides a collision mitigation apparatus that is mounted to an own vehicle and which mitigates a collision between the own vehicle and an obstacle. The collision mitigation apparatus includes right or left turn information acquisition means, area setting means, obstacle presence determination means, mitigation output means. The right or left turn information acquisition means acquires information indicating that an own vehicle will make a right turn or a left turn at an intersection. When the information indicating that the own vehicle will make the right turn or the left turn at the intersection is acquired, the area setting means sets a target area on a predicted route of the own vehicle at the intersection. Then, the obstacle presence determination means determines whether or not an obstacle that becomes an obstacle for travelling of the own vehicle is present in or is entering the target area. When an obstacle is present in or is entering the target area, the mitigation output means performs output to mitigate a collision between the own vehicle and the obstacle.

In this collision mitigation apparatus, when the own vehicle makes a right turn or a left turn at an intersection, a target area is set on a predicted route at the intersection. When an obstacle is present in or is entering the target area, output is performed to mitigate a collision between the own vehicle and the obstacle. Therefore, malfunction at the intersection can be suppressed.

In the present disclosure, "mitigating a collision" refers to suppressing a collision, mitigating the damage (impact) resulting from a collision, or prompting an operation to suppress a collision or mitigate the damage resulting from a collision. In addition, the expression according to each claim may be arbitrarily combined if at all possible. In this case, some configurations may be omitted to an extent enabling the object of the invention to be achieved

DESCRIPTION OF EMBODIMENTS

An embodiment of the present disclosure will hereinafter be described with reference to the drawings.

(Configuration)

A collision mitigation apparatus 1 to which the present disclosure is applied is mounted in a vehicle (own vehicle) such as a passenger car, and provides a function for mitigating a collision of the own vehicle. In other words, the collision mitigation apparatus 1 performs vehicle control to suppress a collision or to mitigate the damage (impact) resulting from a collision, or performs an operation to prompt an operation to suppress a collision or to mitigate the damage resulting from a collision.

In particular, in the collision mitigation apparatus 1 of the present embodiment, when the own vehicle turns left or right (makes a right turn or a left turn) at an intersection, a target area for determining the presence or absence of an obstacle (target), such as a pedestrian or another vehicle, is set on a predicted route (based on estimated behavior) on which the own vehicle travels, rather than the area in front of the own vehicle to which the target area is normally set. When an obstacle is present in or is entering the target area, the collision mitigation apparatus 1 performs output to mitigate a collision.

Figure 1:
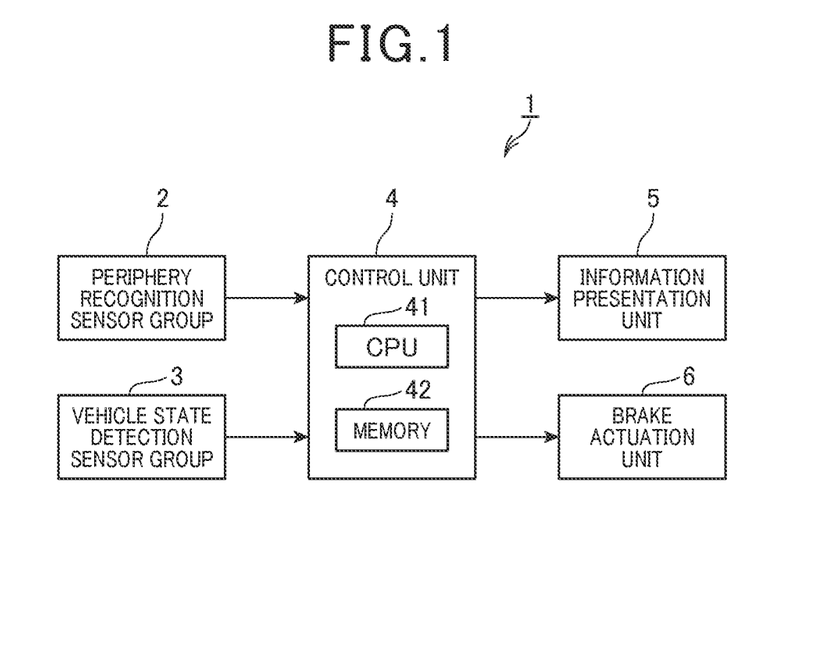
FIG. 1 is a block diagram of an overall configuration of a collision mitigation apparatus.

Specifically, as shown in FIG. 1, the collision mitigation apparatus 1 includes a periphery recognition sensor group 2, a vehicle state detection sensor group 3, a control unit 4, an information presentation unit 5, and a brake actuation unit 6.

The periphery recognition sensor group 2 includes: an image sensor that captures images of the periphery of the vehicle and detects various targets; a radar sensor that uses millimeter waves or sound waves to detect the distance to a target present in the periphery of the vehicle and relative speed thereof; a global positioning system (GPS) sensor that detects the current position of the vehicle; a locator; and the like.

Figure 2:
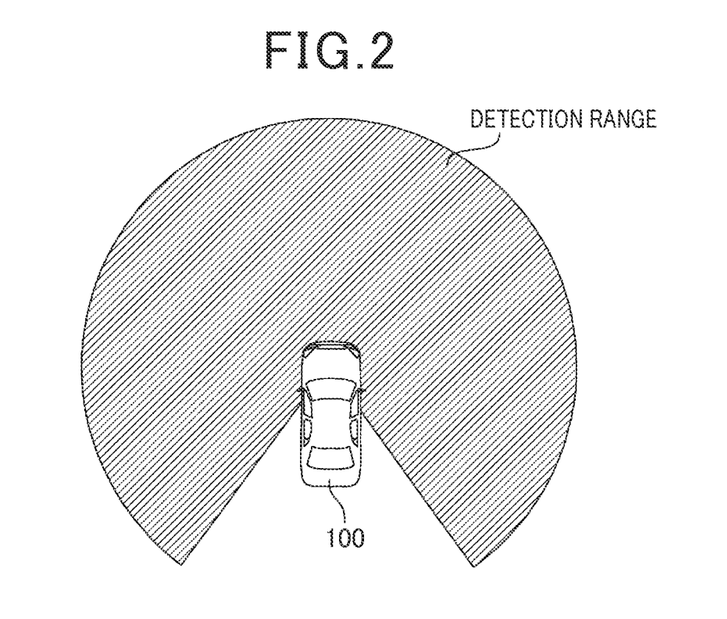
FIG. 2 is an explanatory diagram of a detection range of a periphery recognition sensor group.

As shown in FIG. 2, the detection range of the periphery recognition sensor group 2 is set so as to cover substantially the overall periphery, excluding a section behind an own vehicle 100 (such as a ±20°-area behind the own vehicle 100).

The vehicle state detection sensor group 3 includes at least a turn signal sensor that detects the actuation state of a turn signal and a speed sensor that detects the speed of the vehicle.

The information presentation unit 5 includes a display apparatus that displays images and text, as well as a lamp, a buzzer, or the like that visually or aurally alerts the driver. The information presentation unit 5 performs an operation to alert the driver based on a command from the control unit 4.

The brake actuation unit 6 is configured as an actuator for actuating the brakes or the like to brake the own vehicle. The brake actuation unit 6 brakes the own vehicle based on a command from the control unit 4.

The control unit 4 is configured by a known computer that includes a central processing unit (CPU) 41 and a memory 42, such as a read-only memory (ROM) or a random access memory (RAM). The CPU 41 performs various processes, such as a pre-crash safety system (PCS) process described hereafter, based on programs stored in the memory 42. The memory 42 records therein map information including intersection information, such as intersection positions, intersection shapes, the number of traffic lanes in a road connected to an intersection, and the like. Information on an intersection corresponding to the position of the own vehicle is successively read out from the memory 42.

(Processes)

Figure 3:
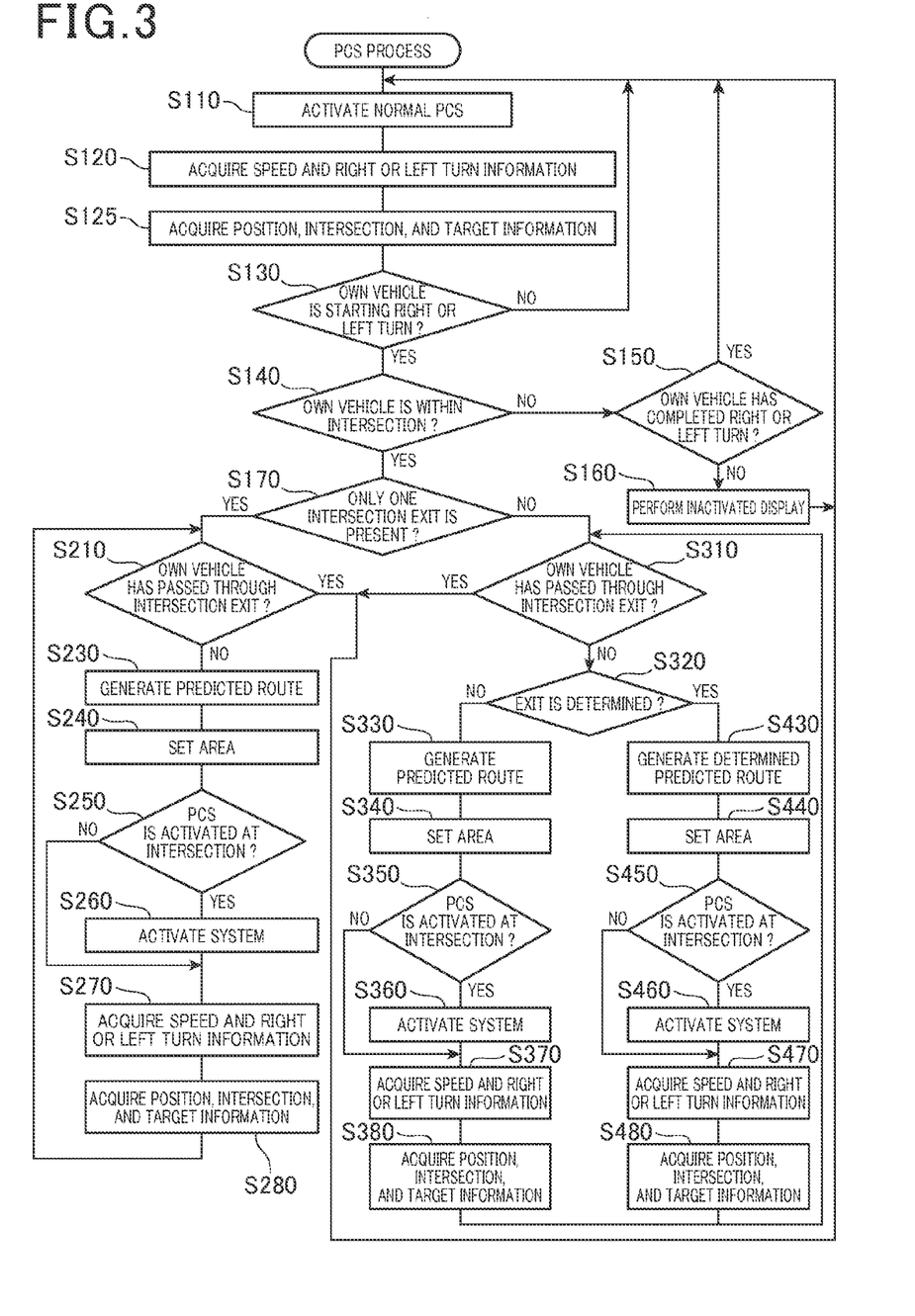
FIG. 3 is a flowchart of a PCS process performed by a CPU of a control unit.

In the collision mitigation apparatus 1 configured in this way, the control unit 4 performs the PCS process shown in FIG. 3. The PCS process is started when, for example, the pre-crash safety system in the own vehicle 100 is turned on, and is continuously performed thereafter until the pre-crash safety system is turned off.

As shown in FIG. 3, in the PCS process, first, the control unit 4 activates normal PCS (step S110). Normal PCS indicates function as a known pre-crash safety system.

In other words, a predicted route of the own vehicle is determined from the travelling speed and the steering angle of the own vehicle 100, and a warning area in which a warning is issued and a braking area in which the brakes are applied are set on the predicted route. When an obstacle is detected within the warning area or the braking area, a warning is issued or the brakes are applied. In normal PCS, map information and the like are not used to determine the predicted route, and the shape and the like of an intersection are not considered.

Figure 4:
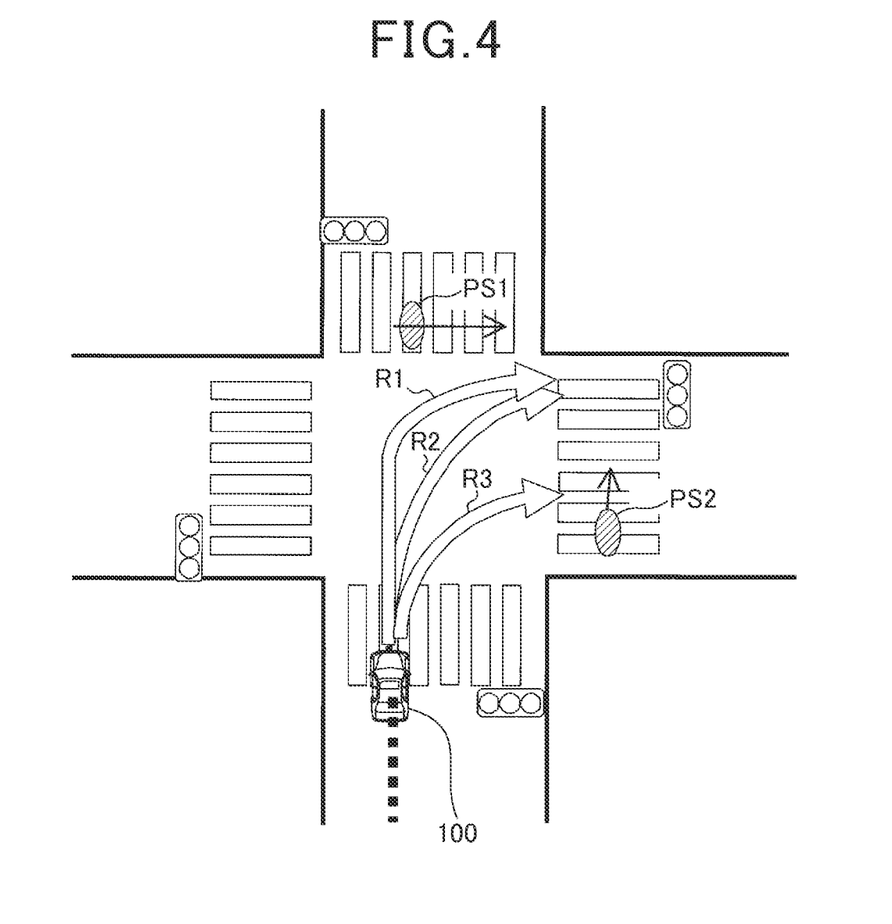
FIG. 4 is a planar view of an example of predicted routes of an own vehicle within an intersection.

Therefore, as shown in FIG. 4, for example, in normal PCS, a warning is issued or the brakes are applied for "person PS1", who is crossing a crosswalk in front of the own vehicle 100. Next, the control unit 4 acquires speed information and right or left turn information (step S120).

Here, the speed information refers to the speed of the own vehicle 100 obtained from the speed sensor. In addition, the right or left turn information refers to the actuation state of the turn signal obtained from the turn signal sensor. The speed information may be speed information obtained from the GPS sensor or the like. The right or left turn information may be information indicating that the own vehicle 100 is travelling in a right-turn only lane or a left-turn only lane.

Next, the control unit 4 acquires position information, intersection information, and target information (step S125). In this process, the control unit 4 acquires the information on the current position of the own vehicle 100 from the GPS sensor, and the intersection information on the intersection nearest to the current position from a memory 12. In addition, the control unit 4 also acquires information related to targets obtained from the periphery recognition sensor group 2.

Next, the control unit 4 determines whether or not the own vehicle 100 is starting a right or left turn at an intersection (step S130). In this process, for example, when the right or left turn information is acquired (such as when the turn signal is activated), the control unit 4 determines that the own vehicle 100 is starting a right or left turn.

When determined that the own vehicle 100 is not starting a right or left turn (NO at step S130), the control unit 4 returns to the process at step S110. When determined that the own vehicle 100 is starting a right or left turn (YES at step S130), the control unit 4 determines whether or not the own vehicle 100 is positioned within an intersection (step S140).

When determined that the own vehicle 100 is not positioned within an intersection (NO at step S140), the control unit 4 determines whether or not the own vehicle 100 has completed the right or left turn (step S150). In this process, for example, when determined that the own vehicle 100 is positioned within an intersection in the previous process at S140, and subsequently determined that the own vehicle 100 is not positioned within an intersection, the control unit 4 determines that the own vehicle 100 has completed the right or left turn.

When determined that the own vehicle 100 has not completed the right or left turn (NO at step S150), the control unit 4 sends a command to the information presentation unit 5 to perform inactivated display indicating that the pre-crash safety system is not activated (step S160), and returns to the process at step S110. Meanwhile, when determined that the own vehicle 100 has completed the right or left turn (YES at step S150), the control unit 4 returns to the process at step S110.

In the process at step S140, when determined that the own vehicle 100 is positioned within an intersection (YES at step S140), the control unit 4 determines the number of traveling courses at the intersection exit (step S170). In other words, the control unit 4 determines the number of traffic lanes in the road on which the own vehicle 100 is to travel after making the right or left turn (in the direction in which the own vehicle 100 is to travel), and the number of roads that the own vehicle 100 is able to enter by making the right or left turn.

The control unit 4 uses the intersection information acquired from the memory 12 to make the determination. In this process, the control unit 4 makes an affirmative determination when the likelihood of the own vehicle 100 entering the road is present for a plurality of roads when the own vehicle 100 makes the right or left turn, such as when the intersection is a five- or six-forked intersection, or when a plurality of traffic lanes are present following the intersection, as shown in FIG. 5.

When determined that the number of traveling courses at the intersection exit is one (YES at step S170), the control unit 4 determines whether or not the own vehicle 100 has passed through the intersection exit (step S210). When determined that the own vehicle 100 has passed through the intersection exit (YES at step S210), the control unit 4 returns to the process at step S110.right or left When determined that the own vehicle 100 has not passed through the intersection exit (NO at step S210), the control unit 4 generates a predicted route (step S230). Here, for example, when the own vehicle 100 makes a right turn at the intersection, as shown in FIG. 4, the following situations can be considered: the own vehicle 100 making a wide turn, as in first route R1; the own vehicle 100 making a sharp turn, as in third route R3; and the own vehicle 100 passing between the first route R1 and the third route R3, as in the second route R2.

Figure 5:
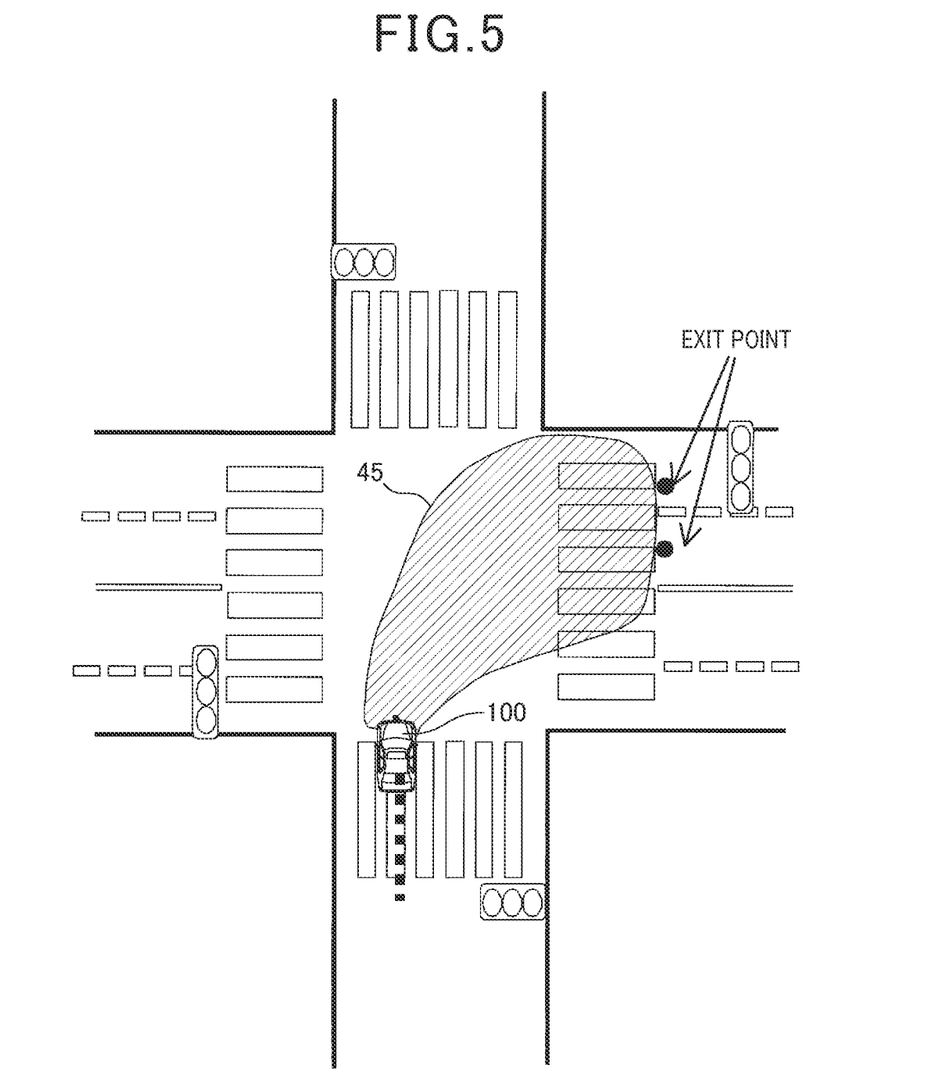
FIG. 5 is a planar view of traffic lanes (exit points) into which the own vehicle is predicted to enter upon entering an intersection.
Figure 6:
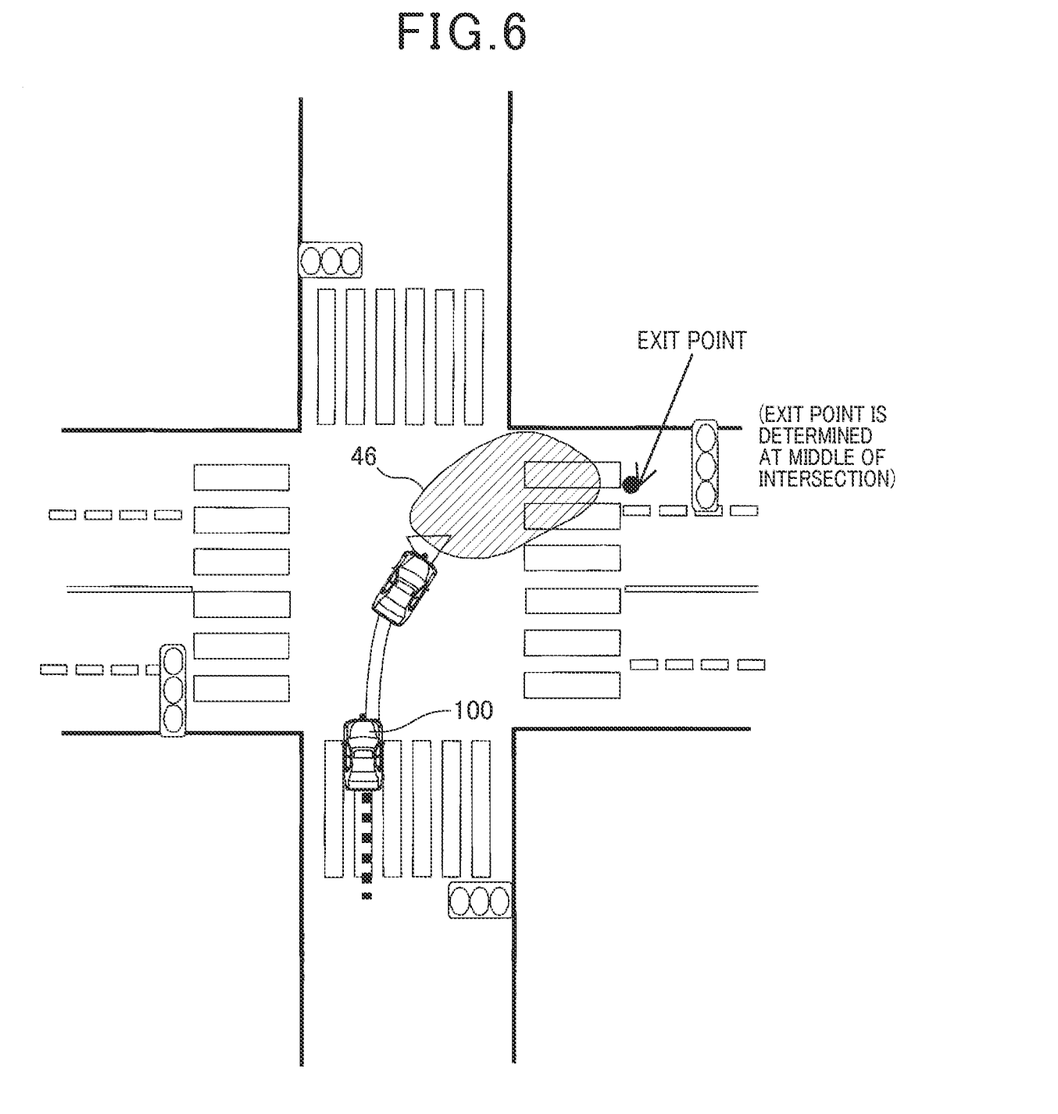
FIG. 6 is a planar view of an example of an own vehicle position when the exit point is determined.

Therefore, as shown in FIG. 5, the predicted route immediately after the own vehicle 100 enters the intersection includes all of the first route R1, the second route R2, and the third route R3 (shown as area 45). In addition, when the own vehicle 100 approaches the vicinity of the center of the intersection, as shown in FIG. 6, the likelihood of the own vehicle 100 passing through route R3 on which the sharpest turn is made becomes extremely low. Therefore, the predicted route in the case shown in FIG. 6 includes route R1 and route R2 (shown as area 46), and determination be made regarding the traffic lane that the own vehicle 100 enters at the intersection exit.

The predicted route obtained in the present process is a route from the position of the own vehicle 100 to a predetermined exit point in each traffic lane that the own vehicle 100 is able to enter at the intersection exit. The route can be predicted by estimating the extent by which speed, steering angle, and the like of the own vehicle 100 will change in the near future. Therefore, the predicted route becomes further narrowed down as the own vehicle 100 approaches the exit point, enabling the exit point to be determined.

Next, the control unit 4 sets a target area (step S240). Here, the target area refers to the aforementioned warning area and braking area, and is set on the predicted route and the periphery thereof. Therefore, when the control unit 4 performs this process, normal PCS is no longer active.

Figure 7:
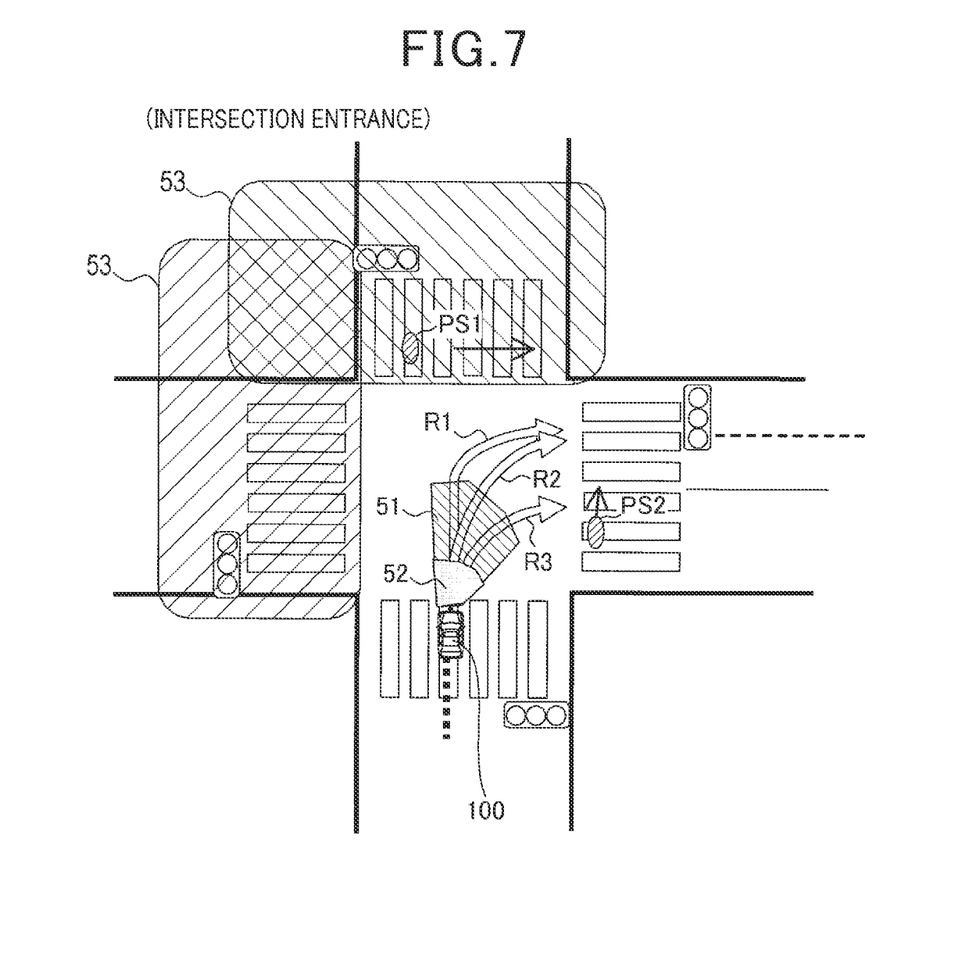
FIG. 7 is a planar view of an example of a target area (intersection entrance)

For example, when the own vehicle is positioned at the entrance of the intersection, as shown in FIG. 7, a route through which the own vehicle 100 will pass cannot be determined from the first route R1, the second route R2, and the third route R3. Thus, an area including all three routes R1 to R3 is set as the target area. In other words, as shown in FIG. 7, a warning area 51 and a braking area 52 are set on the predicted routes and the periphery thereof, and a system activation off-target areas 53 is set on an area other than the predicted routes, for example, an area on a crosswalk other than the predicted routes (in FIG. 7, an area in front of the own vehicle 100 and an area of a crosswalk of the intersection on the left side in FIG. 7 opposite to a crosswalk of the intersection on the right side in FIG. 7, i.e., the predicted routes). Therefore, "person PS1", who is a target for warning and braking in normal PCS, is not a target for warning and braking according to the present embodiment, and a malfunction can clearly be suppressed.

Figure 8:
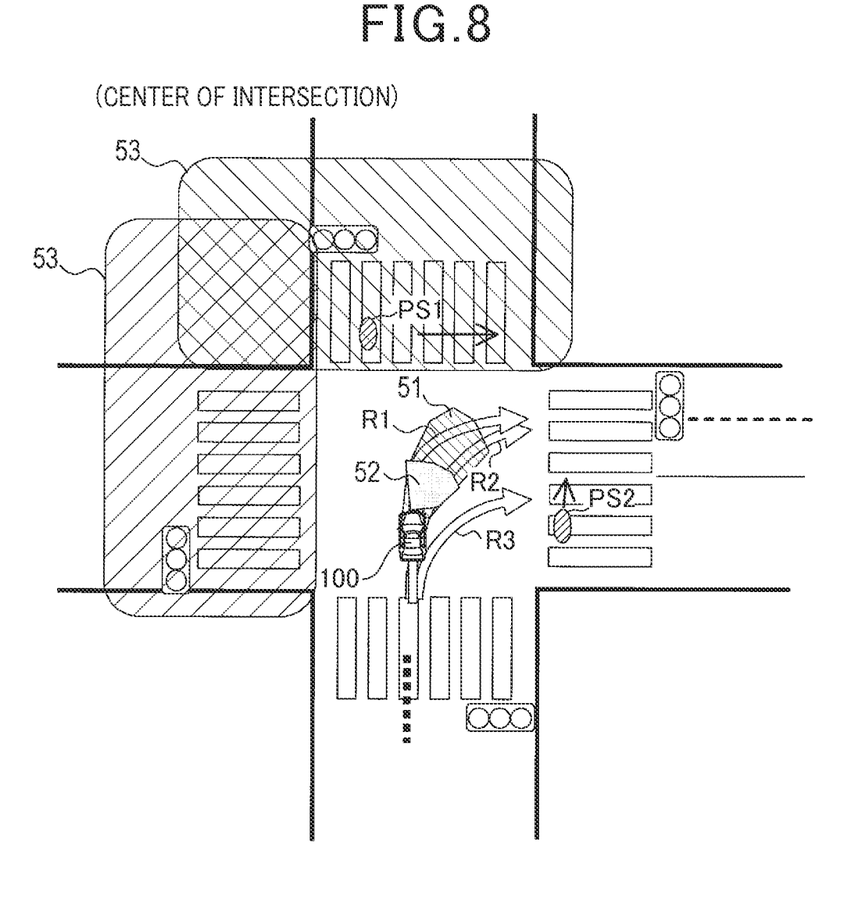
FIG. 8 is a planar view of an example of a target area (center of intersection)

In addition, when the own vehicle 100 approaches the vicinity of the center of the intersection, in the example shown in FIG. 8, the likelihood of the own vehicle 100 passing through the third route R3 on which the sharpest turn is made becomes extremely low. Therefore, the area including the first route R1 and the second route R2 is set as the target area. In this case, it is clear that the lateral width (length in the width direction of the own vehicle 100) of the target area becomes shorter than that of the target area shown in FIG. 7.

Figure 9:
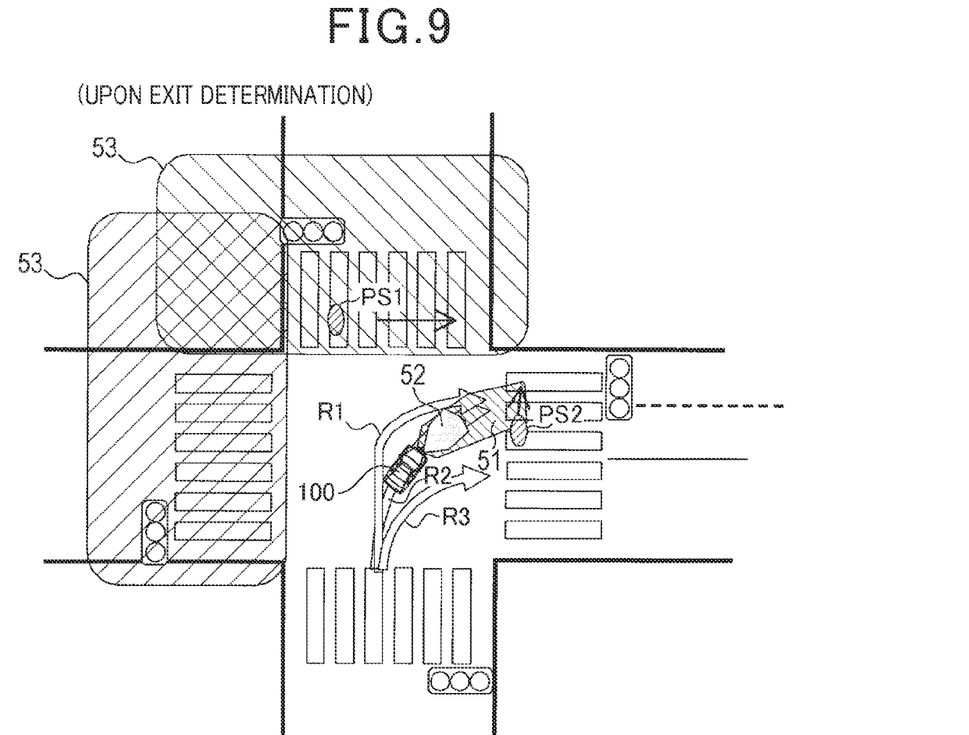
FIG. 9 is a planar view of an example of a target area (upon determination of intersection exit).

Furthermore, when the own vehicle 100 approaches the vicinity of the intersection exit, in the example shown in FIG. 9, the likelihood of the own vehicle passing through the first route R1 on which the widest turn is made becomes extremely low. In addition, the traffic lane in which the own vehicle 100 will attempt to travel after passing through the intersection can also be determined. In this case, it is clear that the lateral width of the target area becomes shorter than those of the target areas shown in FIG. 7 and FIG. 8.

In the example shown in FIG. 9, a warning is issued because "person PS2" is present in the warning area 51 on the predicted route of the own vehicle 100. The wideness of the target area (length in the advancing direction of the own vehicle) can be set based on the relative speeds of the own vehicle 100 and the target, the absolute speed of the own vehicle 100, and the like.

Next, the control unit 4 determines whether or not to activate PCS at the intersection (step S250). In other words, the control unit 4 determines that the PCS is activated at the intersection when a target that becomes an obstacle for travelling of the own vehicle 100 is present in the target area.

In addition, the control unit 4 determines that the PCS is activated at the intersection also when a target that becomes an obstacle for travelling of the own vehicle 100 is expected to enter the target area. Whether or not a target that becomes an obstacle for travelling of the own vehicle 100 will enter the target area can be determined, for example, using the relative speeds of the own vehicle 100 and the target.

When determined that PCS is not activated at the intersection (NO at step S250), the control unit 4 proceeds to the process at step S270, described hereafter. Meanwhile, when determined that PCS is activated at the intersection (YES at step S250), the control unit 4 sends a command to the information presentation unit 5 to issue a warning or to the brake actuation unit 6 to apply brakes, based on the position of the target (step S260).

Next, in a manner similar to that in the process at step S120, the control unit acquires the speed information and right or left turn information (step S270), and in a manner similar to that in the process at step S125, acquires the position information, intersection information, and target information (step S280). After completing this process, the control unit 4 returns to the process at step S210.

In the process at step S170, when determined that a plurality of traveling courses are present at the intersection exit (NO at step S170), the control unit 4 determines whether or not the own vehicle 100 has passed through the intersection exit (step S310). When determined that the own vehicle 100 has passed through the intersection exit (YES at step S310), the control unit 4 returns to the process at step S110.

When determined that the own vehicle 100 has not passed through the intersection exit (NO at step S310), the control unit 4 judges whether or not a determination of the intersection exit is made (step S320). In this process, first, as shown in FIG. 5, when a plurality of traffic lanes (traveling courses) in which the own vehicle 100 is able to enter are present at the intersection exit, the control unit 4 predicts the course of the own vehicle based on the position and movement direction (movement vector: a value determined from speed and steering angle) of the own vehicle 100. Then, when determined that the probability of the own vehicle 100 passing through one of the exit points that are provisionally set for each traffic lane (road) that the course is able to follow is equal to or higher than a predetermined threshold, the control unit 4 judges that the determination of the intersection exit is made (YES at step S320).

When judged that the determination of the intersection exit is not made (NO at step S320), the control unit 4 generates a predicted route (step S330) in a manner similar to that in the process at step S230. Then, in a manner similar to that in the process at step S240, the control unit 4 sets a target area (step S340).

Next, in a manner similar to that in the process at step S250, the control unit 4 determines whether or not to activate PCS at the intersection (step S350). When determined that PCS is not activated at the intersection (NO at step S350), the control unit 4 proceeds to the process at step S370, described hereafter. Meanwhile, when determined that PCS is activated at the intersection (YES at step S350), the control unit 4 sends a command to the information presentation unit 5 to issue a warning or to the brake actuation unit 6 to apply brakes, based on the position of the target (step S360).

Next, in a manner similar to that in the process at step S120, the control unit acquires the speed information and right or left turn information (step S370), and in a manner similar to that in the process at step S125, acquires the position information, intersection information, and target information (step S380). After completing this process, the control unit 4 returns to the process at step S310.

When judged that the determination of the intersection exit is made at the process at step S320 (YES at step S320), the control unit 4 generates a predicted route in a manner similar to that in the process at step S230 (step S430). Then, in a manner similar to that in the process at step S240, the control unit 4 sets a target area (step S440).

Next, in a manner similar to that in the process at step S250, the control unit 4 determines whether or not to activate PCS at the intersection (step S450). When determined that PCS should not be activated at the intersection (NO at step S450), the control unit 4 proceeds to the process at step S470, described hereafter. Meanwhile, when determined that PCS is activated at the intersection (YES at step S450), the control unit 4 sends a command to the information presentation unit 5 to issue a warning or to the brake actuation unit 6 to apply brakes, based on the position of the target (step S460).

Next, in a manner similar to that in the process at step S120, the control unit acquires the speed information and right or left turn information (step S470), and in a manner similar to that in the process at step S125, acquires the position information, intersection information, and target information (step S480). After completing this process, the control unit 4 returns to the process at step S310.

(Effects)

In the collision mitigation apparatus 1 described in detail as above, the control unit 4 acquires information indicating that the own vehicle 100 will make a right turn or a left turn at an intersection. Upon acquiring the information indicating that the own vehicle 100 will make a right turn or a left turn at an intersection, the control unit 4 sets a target area on the predicted route of the own vehicle 100 at the intersection. Then, the control unit 4 determines whether or not an obstacle that becomes an obstacle for travelling of the own vehicle 100 is present in or is entering the target area. When determined that an obstacle is present in or is entering the target area, the control unit 4 performs output to mitigate a collision between the own vehicle 100 and the obstacle.

In the collision mitigation apparatus 1 such as this, when the own vehicle 100 makes a right turn or a left turn at the intersection, the target area is set on the predicted route at the intersection. When an obstacle is present in or is entering the target area, output to mitigate collision is performed. Therefore, malfunction at an intersection can be suppressed.

In the present disclosure, "mitigating a collision" refers to suppressing a collision, mitigating the damage (impact) resulting from a collision, or prompting an operation to suppress a collision or mitigate the damage resulting from a collision.

In addition, the control unit 4 in the above-described collision mitigation apparatus sets the target area on the predicted route at the intersection where the own vehicle 100 makes a right turn or a left turn, based on previously prepared map information.

In the collision mitigation apparatus such as this, because map information is used, the target area can be set after the predicted route is more accurately identified. In addition, depending on the predicted route of the own vehicle 100, sidewalks can also be included in the target area. In this case, response to a pedestrian or the like running into the street from the sidewalk can be made. Therefore, safety can be improved.

In addition, the control unit 4 in the above-descried collision mitigation apparatus acquires the actuation state of the turn signal of the own vehicle 100 or information indicating that the own vehicle 100 is travelling in a dedicated lane for right turns or left turns, as the information indicating that the own vehicle 100 will make a right turn or a left turn.

In the collision mitigation apparatus such as this, reliable recognition can be made that the own vehicle 100 is to make a right turn or a left turn at an intersection.

In addition, the control unit 4 in the above-described collision mitigation apparatus acquires information indicating that a plurality of traffic lanes are present at an intersection exit. When a plurality of traffic lanes are present at an intersection exit, the control unit 4 predicts the traffic lane in which the own vehicle 100 will travel. The control unit 4 then changes the position of the target area based on the traffic lane through which the own vehicle 100 is predicted to pass.

In the collision mitigation apparatus such as this, when a plurality of traffic lanes are present at the intersection exit, the target area is set taking into consideration the traffic lane through which the own vehicle 100 will pass. Therefore, the target area can be more narrowly set. Therefore, malfunction of output for mitigating a collision can be suppressed.

In addition, the control unit 4 in the above-described collision mitigation apparatus narrows down traffic lanes through which the own vehicle 100 is likely to pass, based on changes in the position of the own vehicle 100. As the traffic lanes through which the own vehicle 100 is likely to pass become further narrowed down, the control unit 4 changes the target area within the intersection to become narrower.

In the collision mitigation apparatus such as this, because the target area becomes narrower as the own vehicle 100 approaches the exit of the intersection, the occurrence of malfunction of output for mitigating a collision at the intersection exit can be suppressed. In addition, the control unit 4 in the above-described collision mitigation apparatus sets, as the target area, the warning area in which a warning is issued to the driver of the own vehicle 100 and the braking area in which the brakes of the own vehicle 100 are applied.

In the collision mitigation apparatus such as this, a warning can be issued to the driver of the own vehicle 100 or the own vehicle 100 can be braked, based on the set warning area and braking area.

(Other Embodiments)

The interpretation of the present disclosure is not limited in any way by the above-described embodiment. A function provided by a single constituent element according to the above-described embodiment may be dispersed as a plurality of constituent elements, or a function provided by a plurality of constituent elements may be integrated into a single constituent element.

Furthermore, at least a part of the configuration according to the above-described embodiment may be replaced with a known configuration having similar functions. Moreover, at least a part of the configuration according to the above-described embodiment may be added to or replace a configuration according to another of the above-described embodiment. Any embodiment included in the technical concept specified only by the wordings of the claims is an embodiment of the present disclosure.

The present disclosure can also be actualized by various modes in addition to the above-described collision mitigation apparatus, such as a system of which a constituent element is the collision mitigation apparatus, a program enabling a computer to function as the collision mitigation apparatus, a recording medium on which the program is recorded, and a collision mitigation method.

(Correspondence Between the Present Embodiment and the Present Disclosure)

Among the processes performed by the control unit 4 according to the above-described embodiment, the process at step S120 corresponds to right or left turn information acquisition means of the present disclosure, and the process at step S125 according to the above-described embodiment corresponds to traffic lane quantity acquisition means of the present disclosure. In addition, the processes at steps S240, S340, and S440 according to the above-described embodiment correspond to an area setting means of the present disclosure, and the processes at steps S250, S350, and S450 according to the above-described embodiment correspond to an obstacle presence determination means of the present disclosure.

Furthermore, the processes at steps S260, S360, and S460 according to the above-described embodiment correspond to a mitigation output means of the present disclosure, and the processes at steps S170, S320, S330, and S430 according to the above-described embodiment correspond to pass-through traffic lane predicting means of the present disclosure.

What is claimed is:

1. A collision mitigation apparatus that is mounted to an own vehicle and which mitigates a collision between the own vehicle and an obstacle, the collision mitigation apparatus comprising:
   right or left turn information acquisition means that acquires information indicating that the own vehicle will make a right turn or a left turn at an intersection;
   area setting means that, when the information indicating that the own vehicle will make the right turn or the left turn at the intersection is acquired, sets a target area on a predicted route of the own vehicle at the intersection so as to exclude at least a part of an area on a crosswalk of the intersection that does not include the predicted route of the own vehicle;
   obstacle presence determination means that determines whether or not an obstacle that becomes an obstacle for travelling of the own vehicle is present in or is entering the target area; and
   mitigation output means that, when the obstacle is present in or is entering the target area, performs output to mitigate a collision between the own vehicle and the obstacle.

2. The collision mitigation apparatus according to claim 1, wherein
   the area setting means sets the target area on the predicted route at the intersection where the own vehicle makes the right turn or the left turn, based on previously prepared map information.

3. The collision mitigation apparatus according to claim 2, wherein
   the right or left turn information acquisition means acquires an actuation state of a turn signal of the own vehicle or information indicating that the own vehicle is travelling in a dedicated lane for a right turn or a left turn, as the information indicating that the own vehicle will make a right turn or a left turn.

4. The collision mitigation apparatus according to claim 1, wherein
   when the information indicating that the own vehicle will make the right turn or the left turn at the intersection is acquired, the area setting means sets a target area on a predicted route of the own vehicle at the intersection so as to exclude an area on a front-side crosswalk of the intersection that is positioned on a front side of the own vehicle.

5. The collision mitigation apparatus according to claim 1, wherein
   when the information indicating that the own vehicle will make the right turn at the intersection is acquired, the area setting means sets a target area on a predicted route of the own vehicle at the intersection so as to exclude an area on a left-side crosswalk of the intersection that is positioned on a left side of the own vehicle.

6. The collision mitigation apparatus according to claim 1, wherein
   when the information indicating that the own vehicle will make the left turn at the intersection is acquired, the area setting means sets a target area on a predicted route of the own vehicle at the intersection so as to exclude an area on a right-side crosswalk of the intersection that is positioned on a right side of the own vehicle.

7. A collision mitigation apparatus that is mounted to an own vehicle and which mitigates a collision between the own vehicle and an obstacle, the collision mitigation apparatus comprising:
   right or left turn information acquisition means that acquires information indicating that the own vehicle will make a right turn or a left turn at an intersection;
   area setting means that, when the information indicating that the own vehicle will make the right turn or the left turn at the intersection is acquired, sets a target area on a predicted route of the own vehicle at the intersection;
   obstacle presence determination means that determines whether or not an obstacle that becomes an obstacle for travelling of the own vehicle is present in or is entering the target area; and
   mitigation output means that, when the obstacle is present in or is entering the target area, performs output to mitigate a collision between the own vehicle and the obstacle,
   wherein:
   the area setting means sets the target area on the predicted route at the intersection where the own vehicle makes the right turn or the left turn, based on previously prepared map information; and
   the right or left turn information acquisition means acquires an actuation state of a turn signal of the own vehicle or information indicating that the own vehicle is travelling in a dedicated lane for a right turn or a left turn, as the information indicating that the own vehicle will make a right turn or a left turn,
   the collision mitigation apparatus further comprising:
   traffic lane quantity acquisition means that acquires information indicating that a plurality of traffic lanes are present at an intersection exit; and
   pass-through traffic lane predicting means that, when a plurality of traffic lanes are present at an intersection exit, predicts a traffic lane, among the plurality of traffic lanes, through which the own vehicle will pass, based on a position of the own vehicle, wherein the area setting means changes a position of the target area based on the traffic lane through which the own vehicle is predicted to pass.

8. The collision mitigation apparatus according to claim 7, wherein:
the traffic lane quantity acquisition means narrows down traffic lanes through which the own vehicle is likely to pass, based on changes in a position of the own vehicle; and
the area setting means changes the target area within the intersection to become narrower as the traffic lanes, through which the own vehicle is likely to pass, become further narrowed down.

9. The collision mitigation apparatus according to claim 8, wherein
the area setting means sets, as the target area, a warning area in which a warning is issued to a driver of the own vehicle and a braking area in which the own vehicle is braked.

10. A collision mitigation apparatus that is mounted to an own vehicle and which mitigates a collision between the own vehicle and an obstacle, the collision mitigation apparatus comprising:
right or left turn information acquisition means that acquires information indicating that the own vehicle will make a right turn or a left turn at an intersection;
area setting means that, when the information indicating that the own vehicle will make the right turn or the left turn at the intersection is acquired, sets a target area on a predicted route of the own vehicle at the intersection;
obstacle presence determination means that determines whether or not an obstacle that becomes an obstacle for travelling of the own vehicle is present in or is entering the target area;
mitigation output means that, when the obstacle is present in or is entering the target area, performs output to mitigate a collision between the own vehicle and the obstacle;
traffic lane quantity acquisition means that acquires information indicating that a plurality of traffic lanes are present at an intersection exit; and
pass-through traffic lane predicting means that, when a plurality of traffic lanes are present at an intersection exit, predicts a traffic lane, among the plurality of traffic lanes, through which the own vehicle will pass, based on a position of the own vehicle,
wherein the area setting means changes a position of the target area based on the traffic lane through which the own vehicle is predicted to pass.

11. The collision mitigation apparatus according to claim 10, wherein:
the traffic lane quantity acquisition means narrows down traffic lanes through which the own vehicle is likely to pass, based on changes in a position of the own vehicle; and
the area setting means changes the target area within the intersection to become narrower as the traffic lanes, through which the own vehicle is likely to pass, become further narrowed down.

12. A collision mitigation apparatus that is mounted to an own vehicle and which mitigates a collision between the own vehicle and an obstacle, the collision mitigation apparatus comprising:

right or left turn information acquisition means that acquires information indicating that the own vehicle will make a right turn or a left turn at an intersection;
area setting means that, when the information indicating that the own vehicle will make the right turn or the left turn at the intersection is acquired, sets a target area on a predicted route of the own vehicle at the intersection;
obstacle presence determination means that determines whether or not an obstacle that becomes an obstacle for travelling of the own vehicle is present in or is entering the target area; and
mitigation output means that, when the obstacle is present in or is entering the target area, performs output to mitigate a collision between the own vehicle and the obstacle,
wherein
the area setting means sets, as the target area, a warning area in which a warning is issued to a driver of the own vehicle and a braking area in which the own vehicle is braked.

13. A non-transitory computer-readable storage medium storing a collision avoidance program for enabling a computer to function as a collision mitigation apparatus that is mounted to an own vehicle and which mitigates a collision between the own vehicle and an obstacle, the collision mitigation apparatus comprising:
right or left turn information acquisition means that acquires information indicating that the own vehicle will make a right turn or a left turn at an intersection;
area setting means that, when the information indicating that the own vehicle will make the right turn or the left turn at the intersection is acquired, sets a target area on a predicted route of the own vehicle at the intersection so as to exclude at least a part of an area on a crosswalk of the intersection that does not include the predicted route of the own vehicle;
obstacle presence determination means that determines whether or not an obstacle that becomes an obstacle for travelling of the own vehicle is present in or is entering the target area; and
mitigation output means that, when the obstacle is present in or is entering the target area, performs output to mitigate a collision between the own vehicle and the obstacle.

14. A collision mitigation method comprising:
acquiring, by a collision mitigation apparatus that is mounted to an own vehicle and which mitigates a collision between the own vehicle and an obstacle, information indicating that the own vehicle will make a right turn or a left turn at an intersection;
when the information indicating that the own vehicle will make the right turn or the left turn at the intersection is acquired, setting, by the collision mitigation apparatus, a target area on a predicted route of the own vehicle at the intersection so as to exclude at least a part of an area on a crosswalk of the intersection that does not include the predicted route of the own vehicle;
determining, by the collision mitigation apparatus, whether or not an obstacle that becomes an obstacle for travelling of the own vehicle is present in or is entering the target area; and
when the obstacle is present in or is entering the target area, performing, by the collision mitigation apparatus, output to mitigate a collision between the own vehicle and the obstacle.

* * * * *